United States Patent
Alexander

(10) Patent No.: US 9,868,054 B1
(45) Date of Patent: Jan. 16, 2018

(54) DYNAMIC GAME DEPLOYMENT

(71) Applicant: JPMorgan Chase Bank, N.A., New York, NY (US)

(72) Inventor: Shawn Wesley Alexander, Brazoria, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 400 days.

(21) Appl. No.: 14/176,924

(22) Filed: Feb. 10, 2014

(51) Int. Cl.
*A63F 13/30* (2014.01)
*A63F 13/00* (2014.01)

(52) U.S. Cl.
CPC .................................. *A63F 13/00* (2013.01)

(58) Field of Classification Search
CPC .......... A63F 13/60; A63F 13/46; A63F 13/61; A63F 13/85
USPC ........................................................... 463/29
See application file for complete search history.

(56) References Cited

U.S. PATENT DOCUMENTS

| | | |
|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,386,551 A | 1/1995 | Chikira et al. |
| 5,446,895 A | 8/1995 | White et al. |
| 5,539,885 A | 7/1996 | Ono et al. |
| 5,549,117 A | 8/1996 | Tacklind et al. |
| 5,563,998 A | 10/1996 | Yakish et al. |
| 5,566,297 A | 10/1996 | Devarakonda |
| 5,594,863 A | 1/1997 | Stiles |
| 5,630,047 A | 5/1997 | Wang |
| 5,630,069 A | 5/1997 | Flores et al. |
| 5,655,074 A | 8/1997 | Rauscher |
| 5,701,471 A | 12/1997 | Subramanyam |
| 5,712,971 A | 1/1998 | Stanfill et al. |
| 5,721,913 A | 2/1998 | Ackroff et al. |
| 5,721,914 A | 2/1998 | De Vries |
| 5,748,878 A | 5/1998 | Rees et al. |
| 5,752,034 A | 5/1998 | Srivastava |
| 5,758,061 A | 5/1998 | Plum |
| 5,768,506 A | 6/1998 | Randell |

(Continued)

FOREIGN PATENT DOCUMENTS

WO 01/74043 10/2001

OTHER PUBLICATIONS

U.S. Appl. No. 61/792,808, Chelst, provisional application, filed Mar. 15, 2013.*

(Continued)

*Primary Examiner* — Michael Cuff
(74) *Attorney, Agent, or Firm* — Goodwin Procter LLP

(57) ABSTRACT

Systems and methods are disclosed for dynamic game deployment. In one implementation, a processing device provides a first game to a first user. The processing device receives one or more first interactions from the first user with respect to the first game. The processing device processes the one or more first interactions to compute a value associated with a defined achievement. The processing device generating, based on the value, a first prompt, the first prompt comprising a notification of a first reward associated with the defined achievement. The processing device provides the first prompt within the first game.

13 Claims, 6 Drawing Sheets

(56) References Cited

U.S. PATENT DOCUMENTS

| | | |
|---|---|---|
| 5,781,448 A | 7/1998 | Nakamura et al. |
| 5,784,562 A | 7/1998 | Diener |
| 5,799,297 A | 8/1998 | Goodridge et al. |
| 5,806,075 A | 9/1998 | Jain et al. |
| 5,828,883 A | 10/1998 | Hall |
| 5,835,770 A | 11/1998 | Shum et al. |
| 5,842,196 A | 11/1998 | Agarwal et al. |
| 5,845,292 A | 12/1998 | Bohannon et al. |
| 5,872,976 A | 2/1999 | Yee et al. |
| 5,884,037 A | 3/1999 | Aras et al. |
| 5,903,721 A | 5/1999 | Sixtus |
| 5,903,897 A | 5/1999 | Carrier, III et al. |
| 5,920,719 A | 7/1999 | Sutton et al. |
| 5,937,198 A | 8/1999 | Nelson et al. |
| 5,960,196 A | 9/1999 | Carrier, III et al. |
| 5,960,445 A | 9/1999 | Tamori et al. |
| 5,995,965 A | 11/1999 | Experton |
| 6,003,075 A | 12/1999 | Arendt et al. |
| 6,009,274 A | 12/1999 | Fletcher et al. |
| 6,026,237 A | 2/2000 | Berry et al. |
| 6,028,938 A | 2/2000 | Malkin et al. |
| 6,029,002 A | 2/2000 | Afifi et al. |
| 6,058,393 A | 5/2000 | Meier et al. |
| 6,061,503 A | 5/2000 | Chamberlain |
| 6,061,686 A | 5/2000 | Gauvin et al. |
| 6,067,412 A | 5/2000 | Blake et al. |
| 6,073,107 A | 6/2000 | Minkiewicz et al. |
| 6,088,700 A | 7/2000 | Larsen et al. |
| 6,101,601 A | 8/2000 | Matthews et al. |
| 6,108,673 A | 8/2000 | Brandt et al. |
| 6,125,390 A | 9/2000 | Touboul |
| 6,128,708 A | 10/2000 | Fitzpatrick et al. |
| 6,138,112 A | 10/2000 | Slutz |
| 6,145,121 A | 11/2000 | Levy et al. |
| 6,167,534 A | 12/2000 | Straathof et al. |
| 6,175,833 B1 | 1/2001 | West et al. |
| 6,195,676 B1 | 2/2001 | Spix et al. |
| 6,230,319 B1 | 5/2001 | Britt, Jr. et al. |
| 6,237,035 B1 | 5/2001 | Himmel et al. |
| 6,237,143 B1 | 5/2001 | Fontana et al. |
| 6,243,862 B1 | 6/2001 | Lebow |
| 6,247,029 B1 | 6/2001 | Kelley et al. |
| 6,249,877 B1 | 6/2001 | Kawakami et al. |
| 6,269,479 B1 | 7/2001 | Puram |
| 6,279,039 B1 | 8/2001 | Bhat et al. |
| 6,301,701 B1 | 10/2001 | Walker et al. |
| 6,311,327 B1 | 10/2001 | O'Brien et al. |
| 6,363,499 B1 | 3/2002 | Delo et al. |
| 6,363,524 B1 | 3/2002 | Loy |
| 6,405,250 B1 | 6/2002 | Lin et al. |
| 6,405,364 B1 | 6/2002 | Bowman-Amuah |
| 6,411,910 B1 | 6/2002 | Eulau et al. |
| 6,424,981 B1 | 7/2002 | Isaac et al. |
| 6,438,749 B1 | 8/2002 | Chamberlain |
| 6,446,126 B1 | 9/2002 | Huang et al. |
| 6,463,454 B1 | 10/2002 | Lumelksy et al. |
| 6,466,980 B1 | 10/2002 | Lumelksy et al. |
| 6,467,052 B1 | 10/2002 | Kaler et al. |
| 6,470,464 B2 | 10/2002 | Bertram et al. |
| 6,477,471 B1 | 11/2002 | Hedstrom et al. |
| 6,502,207 B1 | 12/2002 | Itoh et al. |
| 6,505,176 B2 | 1/2003 | DeFrancecso, Jr. et al. |
| 6,513,154 B1 | 1/2003 | Porterfield |
| 6,519,763 B1 | 2/2003 | Kaufer et al. |
| 6,526,443 B1 | 2/2003 | Goldsmith et al. |
| 6,546,506 B1 | 4/2003 | Lewis |
| 6,560,580 B1 | 5/2003 | Fraser et al. |
| 6,578,004 B1 | 6/2003 | Cimral et al. |
| 6,578,006 B1 | 6/2003 | Saito et al. |
| 6,584,447 B1 | 6/2003 | Fox et al. |
| 6,587,841 B1 | 7/2003 | DeFrancecso, Jr. et al. |
| 6,601,017 B1 | 7/2003 | Kennedy et al. |
| 6,601,018 B1 | 7/2003 | Logan |
| 6,601,233 B1 | 7/2003 | Underwood |
| 6,626,953 B2 | 9/2003 | Johndrew et al. |
| 6,629,266 B1 | 9/2003 | Harper et al. |
| 6,820,088 B1 | 11/2004 | Hind et al. |
| 6,826,745 B2 | 11/2004 | Coker et al. |
| 6,920,467 B1 | 7/2005 | Yoshimoto |
| 6,934,934 B1 | 8/2005 | Osborne, II et al. |
| 8,210,849 B1* | 7/2012 | Murphy-Aniceto ............ G09B 19/0092 434/127 |
| 2002/0004912 A1 | 1/2002 | Fung |
| 2002/0133593 A1 | 9/2002 | Johnson et al. |
| 2002/0133757 A1 | 9/2002 | Bertram et al. |
| 2002/0138571 A1 | 9/2002 | Trinon et al. |
| 2002/0143929 A1 | 10/2002 | Maltz et al. |
| 2002/0147961 A1 | 10/2002 | Charters et al. |
| 2002/0162090 A1 | 10/2002 | Parnell et al. |
| 2002/0165754 A1 | 11/2002 | Tang et al. |
| 2003/0004848 A1 | 1/2003 | Hellerstein et al. |
| 2003/0018952 A1 | 1/2003 | Roetzheim |
| 2003/0033586 A1 | 2/2003 | Lawler |
| 2003/0041000 A1 | 2/2003 | Zajac et al. |
| 2003/0065644 A1 | 4/2003 | Horman et al. |
| 2003/0120539 A1 | 6/2003 | Korium et al. |
| 2003/0144868 A1 | 7/2003 | MacIntyre et al. |
| 2003/0188290 A1 | 10/2003 | Corral |
| 2003/0196190 A1 | 10/2003 | Ruffalo et al. |
| 2003/0212518 A1 | 11/2003 | De'Allessandro et al. |
| 2003/0225662 A1 | 12/2003 | Horan et al. |
| 2003/0225663 A1 | 12/2003 | Horan et al. |
| 2005/0071807 A1 | 3/2005 | Yanai |
| 2009/0098980 A1* | 4/2009 | Waters .................... A63B 22/02 482/8 |
| 2009/0305772 A1* | 12/2009 | Melendez ................. A63F 9/00 463/23 |
| 2009/0325701 A1* | 12/2009 | Andres Del Valle ... A63F 13/12 463/36 |
| 2013/0117181 A1* | 5/2013 | Isaacson ................ G06Q 20/10 705/41 |
| 2014/0274413 A1* | 9/2014 | Chelst .................... A63F 13/795 463/42 |

OTHER PUBLICATIONS

Alessandra Agostini et al, A light workflow management system using simple process models, Computer Supported Cooperative Work, pp. 335-363 (Nov. 2000).
Betwixt: Turning beans into XML, http://web.archive.org/web/20020620000410/http://jakarta.apache.org/commons/betwixt (last visited Nov. 13, 2005).
Claes Wohlin et al, Understanding the Sources of Software Defects: A Filtering Approach (Abstract), 8th Int'l Workshop on Program Comprehension, p. 9 (2000).
CSK Software AG, Business Process Automation and Workflow in the Financial Industry (2003).
D.M. Hilbert et al, An approach to large-scale collection of application usage data over the internet (Abstract), Proc. Int'l Conf. Software Engineering, pp. 136-145 (1998).
David S. Lindsay, Software Evaluation, Tests, and Measurements (Abstract), in ACM Computing Rev. (J.E. Sammet, ed.), p. 519 (1981).
Dimitrious Georgakopoulos et al, An Overview of Workflow Management: From Process Modeling to Workflow Automation Infrastructure, Distributed and Parallel Databases, pp. 119-153 (1995).
Drake E. Lundell Jr. et al, Computer Use—an executive's guide (Abstract), in ACM Computing Rev. (M.A. Duggan, ed.), pp. 48-49 (1974).
Esmond Pitt et al, java.rmi: The Remove Method Invocation Guide, Section 3.5 (2001).
ExoLab Group, Using Castor XML, http://web.archive.org/web/20010827042213/http://www.castor.org/xml_framework.html (last visited Nov. 11, 2005).
Graham Hamilton, ed., Sun Microsystems JavaBeans API Specification, pp. 54-82 (1997).
IBM Corporation, Code Generation for Database Applications, IBM Tech. Disclosure Bulletin Mar. 1992 (Mar. 1992).
IBM Corporation, OS/2 EE Database Manager SQLJRA Remote Protocol, IBM Tech. Disclosure Bulletin Jan. 1993, pp. 33-36 (Apr. 1993).

(56) References Cited

OTHER PUBLICATIONS

J.P: Hudepohl et al, Integrating metrics and models for software risk assessment (Abstract), 7th Int'l Conf. Software Reliability Engineering, p. 93 (1996).
Len Reinhart, Liability management: A new tool for financial consultants, Financial Consultant (Fall/Winter 1996).
Mary Campione et al, Java Tutorial: A Short Course on the Basics, Ch. 5 (3d ed. 2000).
Norman E. Fenton et al, A Critique of Software Defect Prediction Models, IEEE Transactions Software Engineering, pp. 675-689 (Sep./Oct. 1999).
S.G. Linkman, Quantitative monitoring of software development by time-based and intercheckpoint monitoring (Abstract), Software Engineering J., pp. 43-49 (Jan. 1990).
Sanjay Mohapatra et al, Defect Prevention through Defect Prediction: A Case Study at Infosys (Abstract), IEEE Int'l Conf. Software Maintenance, p. 260 (2001).
Steve McConnell, Gauging Software Readiness with Defect Tracking, IEEE Software (May/Jun. 1997).
Sybase Inc., Monitor Client Library 12.5 Progammer's Guide (May 2001).
Tze-Jie Yu et al, An Analysis of Several Software Defect Models, IEEE Transactions Software Engineering, pp. 1261-1270 (Sep. 1988).
V. Basili et al, Understanding and predicting the process of software maintenance releases (Abstract), 18th Int'l Conf. Software Engineering, p. 464 (1996).
Ytzhak Levendel, Reliability Anlaysis of Large Software Systems: Defect Data Modeling, IEEE Transactions Software Engineering, pp. 141-152 (Feb. 1990).

* cited by examiner

DYNAMIC GAME DEPLOYMENT

TECHNICAL FIELD

Aspects and implementations of the present disclosure relate to data processing, and more specifically, to dynamic game deployment.

BACKGROUND

Interactive games or challenges can be an effective tool to motivate/incentivize users, employees, etc., to achieve various goals or objectives.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device provides a first game to a first user. The processing device receives one or more first interactions from the first user with respect to the first game. The processing device processes the one or more first interactions to compute a value associated with a defined achievement. The processing device generating, based on the value, a first prompt, the first prompt comprising a notification of a first reward associated with the defined achievement. The processing device provides the first prompt within the first game.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to dynamic game deployment.

It can be appreciated that virtual games/challenges (such as those implemented on electronic devices, e.g., computers, mobile devices, etc.) can be effective in motivating/incentivizing users to achieve various goals/objectives. However, existing technologies do not enable the deployment of such games/challenges in a manner that can effectively incentivize users across organizations and/or enable organization administrators to dynamically configure/adjust aspects of such games/challenges based on various changes that may occur over the course of such game(s).

Accordingly, as described herein, a gamification platform is provided that can enable the deployment of multiple games/challenges across multiple users and/or an entire organization, population, etc. Such a platform can deploy multiple games to various users, and receive various interactions from such users in relation to the various deployed games. As described herein, such interactions (reflecting the various ways in which such users interact with and/or progress within various games) can be analyzed and various aspects of such games can be adjusted/configured based on such analysis (e.g., by providing dynamic notifications to the user suggesting/encouraging a particular action/operation).

Figure 1:
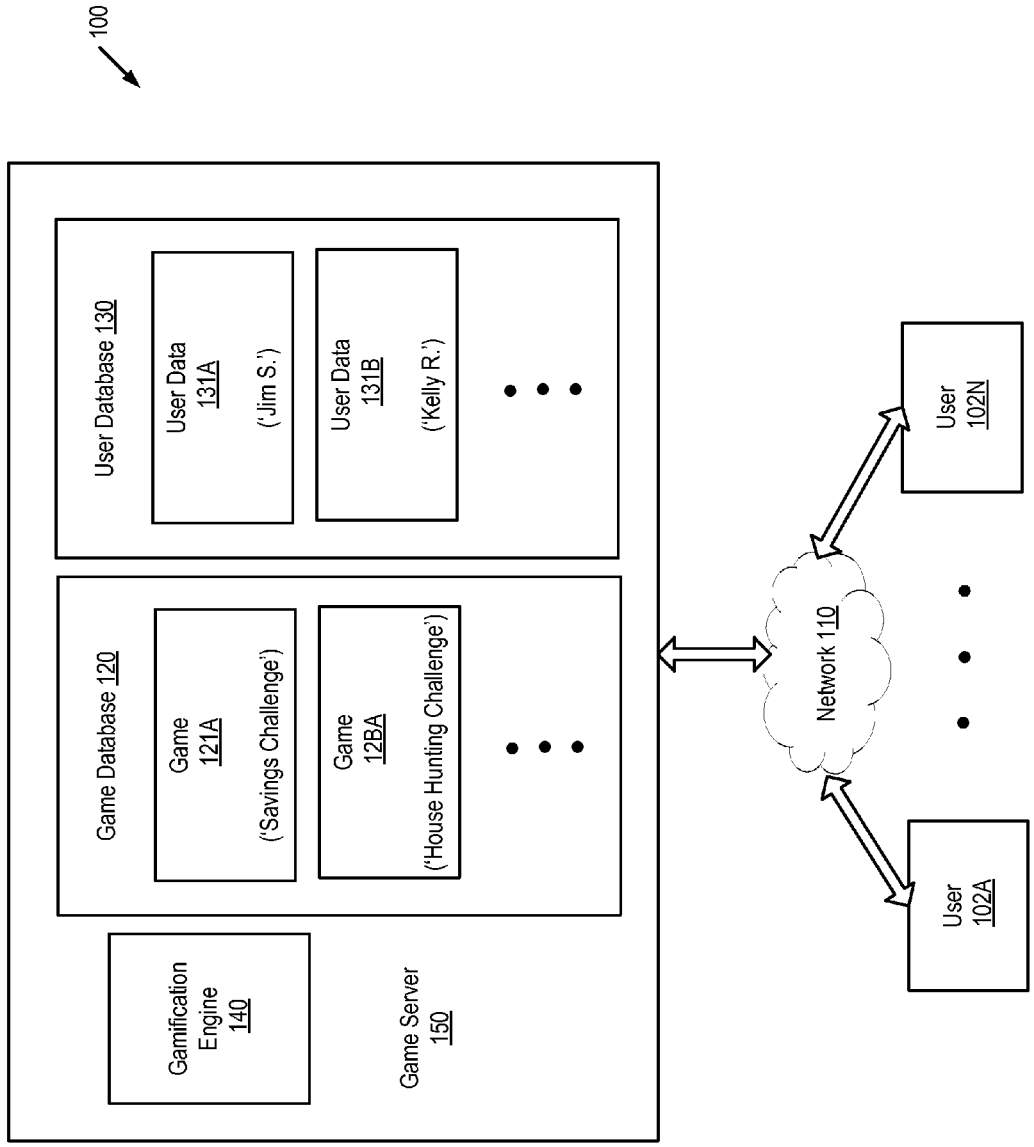
FIG. 1 depicts an illustrative system architecture, in accordance with aspects and implementations of the present disclosure.

FIG. 1 depicts an illustrative system architecture 100, in accordance with one implementation of the present disclosure. The system architecture 100 includes game server 150 which can be configured to communicate with various users 102A-N. These various elements or components can be connected to one another via network 110, which can be a public network (e.g., the Internet), a private network (e.g., a local area network (LAN) or wide area network (WAN)), or a combination thereof.

Server 150 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. As described herein, server 150 can be, for example, a web server, application server, etc., which is capable of transmitting and/or receiving data from various users 102 via network 110.

As depicted in FIG. 1, server 150 can include gamification engine 140 and various databases such as game database 120 and/or user database 130. Game database 120 can be a can be hosted by or on one or more storage devices, such as main memory, magnetic or optical storage based disks, tapes or hard drives, NAS, SAN, and so forth. In some implementations, game database 120 can be a network-attached file server, while in other implementations game database 120 can be some other type of persistent storage such as an object-oriented database, a relational database, and so forth, and can include one or more games 121 (e.g., game 121A, 121B, etc.). Such games can be, for example, webpages, applications, etc., that can be provided to and/or accessed by users 102 and with which such users can interact in various ways. It should be understood that in certain implementations such games can include various graphical interfaces, controls, etc., through which the referenced users can interact with and progress through the game. Examples of such games include, but are not limited to, games or challenges that facilitate users to save money, seek out various financial services, collaborate to achieve various collective goals, etc.

User database 130 can be a database that stores and/or maintains a repository of user data 131 that pertains to various users of games 121 (e.g., user data 131A, 131B, etc.). User database 130 can be a can be hosted by or on one or more storage devices, such as main memory, magnetic or optical storage based disks, tapes or hard drives, NAS, SAN, and so forth. In some implementations, user database 130 can be a network-attached file server, while in other implementations user database 130 can be some other type of persistent storage such as an object-oriented database, a relational database, and so forth, and can include user data 131. Such user data can reflect, for example, various aspects and/or details of the manner in which a particular user has interacted with one or more of games 131. Examples of such user data include, but are not limited to, data that reflects the performance and/or progress of a particular user with respect to one or more particular games 121, etc.

Gamification engine 140 can be one or more applications, modules, etc., that can execute on game server 150. The gamification engine can coordinate the delivery of various games 121 to users 102, and can utilize user data 131 to provide various customized prompts, notifications, etc., to the various users throughout the respective games. Such prompts, notifications, etc., can be dynamically generated based on various user data (whether associated with the user playing the game and/or one or more users), and can be provided at various intervals throughout the game, such as in order to suggest and/or incentivize the user to take one or more further actions, such as in the manner described herein.

Users 102 can be various wireless terminals (e.g., smartphones, etc.), personal computers (PC), laptops, tablet computers, or any other computing or communication devices. It should be understood that the term 'user' or 'users' as utilized herein can refer to such devices which may be controlled by and/or associated with a particular human user (e.g., via a user account or user ID associated with the device). Such devices may run an operating system (OS) that manages hardware and software of the user device. Through such devices, each respective user can receive (e.g., download) and/or access various games 121 (and/or aspects thereof), and various aspects of a user's progress with respect to a particular game can be provided and stored in user database 130, such as is described herein.

In various implementations, game server can enable organizations to deploy games or challenges (whether single or multiplayer) across multiple users (e.g., within the organization). Such games can incentivize such users to achieve one or more goals or tasks. Additionally, the performance of individual users can be tracked and analyzed over time, and various aspects of the game(s) can be adjusted and/or configured to account for changing conditions (e.g., user achievements, changes in value of the objective to the organization, etc.). Additionally, in certain implementations users can compete in such games/challenges as teams or groups, such as in order to accelerate a collective achievement.

Moreover, in certain implementations one or more games/challenges (and/or instances thereof) can be dynamically initiated/created, such as in order to configure such games/challenges with respect to various groups/sets of users. For example, certain games may be created/initiated that are open to the public (i.e., any user can participate in such a game), while other games can be created such that they are limited to a particular group/set of users (e.g., a group of friends, members of a family, etc.). Additionally, certain games may be viewable to the public, while others may be hidden or obscured (such that only the participants in the game can view various related information, e.g., a leaderboard of scores, etc.). In doing so, users can create and engage in one or more of the referenced games within a framework that is comfortable/secure (e.g., only playing among friends, family, etc.).

It should be understood that the game server can be configured to incorporate any number of features and/or functionalities. For example, various application programming interfaces (APIs) can be incorporated in order to enable deployment of the referenced games across a broad spectrum of settings. Additionally, various rewards (e.g., badges, trophies, etc.) can be provided to and accumulated by users based on various achievements within the various games, such as in a manner known to those of ordinary skill in the art. Various dashboards can provide users and/or administrators with updated status reports, reflecting, for example, a user's level of achievement, progress, etc. Additionally, a revenue calculator can be incorporated which can calculate revenue generated for the organization in relation to various interactions, achievements, etc., during the course of one or more game(s). Moreover, one or more anti-cheating and/or anti-collusion modules, functions, etc., can be incorporated in order to detect and/or prevent incidences of cheating, collusion, etc., within the referenced games/challenges, such as in a manner known to those of ordinary skill in the art.

Additionally, in various implementations the rewards achieved/accumulated by a user (such as those described/referenced herein) can be configured such that they can be applied, covered, and/or otherwise leveraged across multiple games (e.g., a reward can be achieved in one game and applied in another). For example, a 'points' scheme can be implemented whereby rewards points can be achieved and accumulated based on various user interactions in different games, thereby enabling a user to accumulate more points overall (and thus, presumably, achieve greater rewards) than would otherwise be possible in scenarios where each game utilizes its own reward points (which are incompatible with one another).

It should be noted that further aspects of the operations of certain components of game server 150 user device 102 are described in more detail below with respect to FIG. 2. It should also be noted that the various components described and/or referenced herein can be combined together or separated in further components, according to a particular implementation (for example, various components of user device 102 may run on separate machines).

Figure 2:
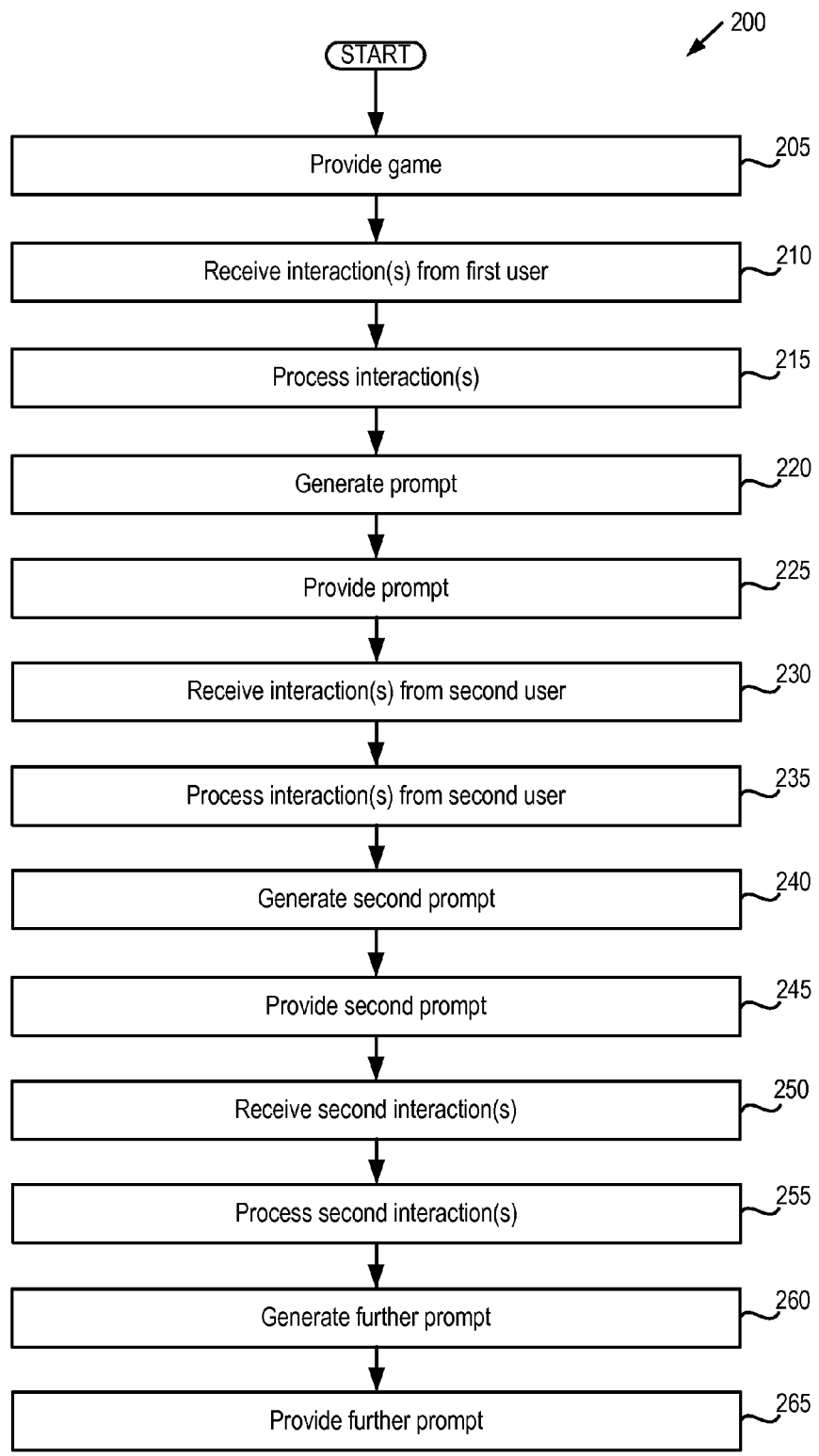
FIG. 2 depicts a flow diagram of aspects of a method for dynamic game deployment in accordance with aspects and implementations of the present disclosure.

FIG. 2 depicts a flow diagram of aspects of a method 200 for dynamic game deployment. The method is performed by processing logic that may comprise hardware (circuitry, dedicated logic, etc.), software (such as is run on a general purpose computer system or a dedicated machine), or a combination of both. In one implementation, the method is performed by game server 150 of FIG. 1, while in some other implementations, one or more blocks of FIG. 2 may be performed by another machine (e.g., by one or more user devices).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 205 a game can be provided. In certain implementations, such a game can be provided to a user (e.g., a first user). For example, such a game can be an application, service, webpage, etc. (and/or a portion or aspect thereof) that a user may download, receive, and/or access, such as via a central server. Such a user can interact with the referenced game in order to compete in one or more challenges, achieve one or more results, achievements, etc. and/or receive one or more rewards. In one aspect, block 205 is performed by gamification engine 140.

Figure 4:
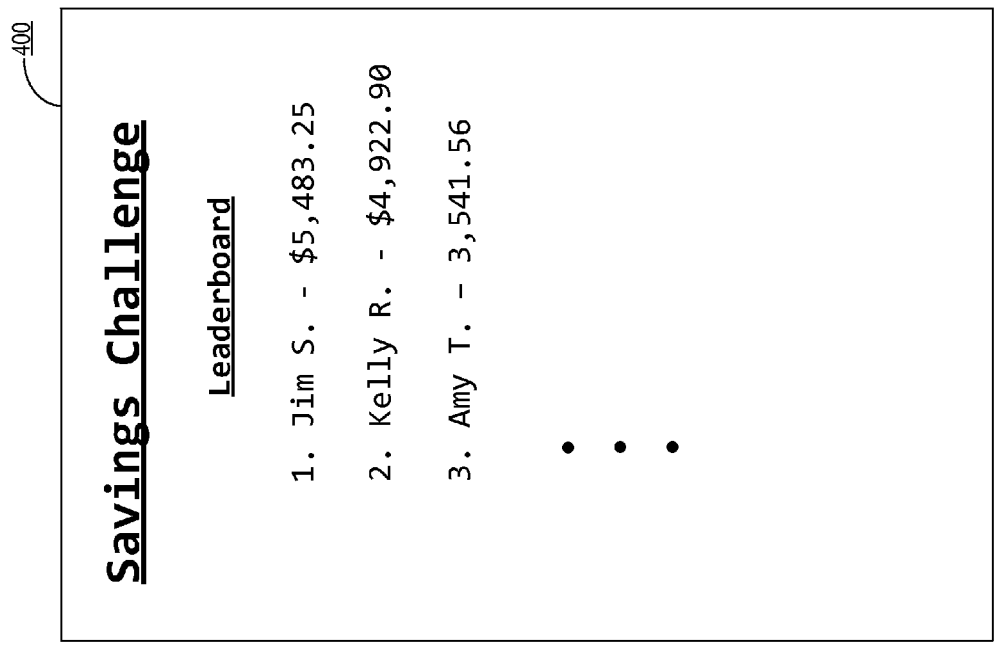
FIG. 4 depicts an exemplary interface of a game in accordance with aspects and implementations of the present disclosure.
Figure 3:
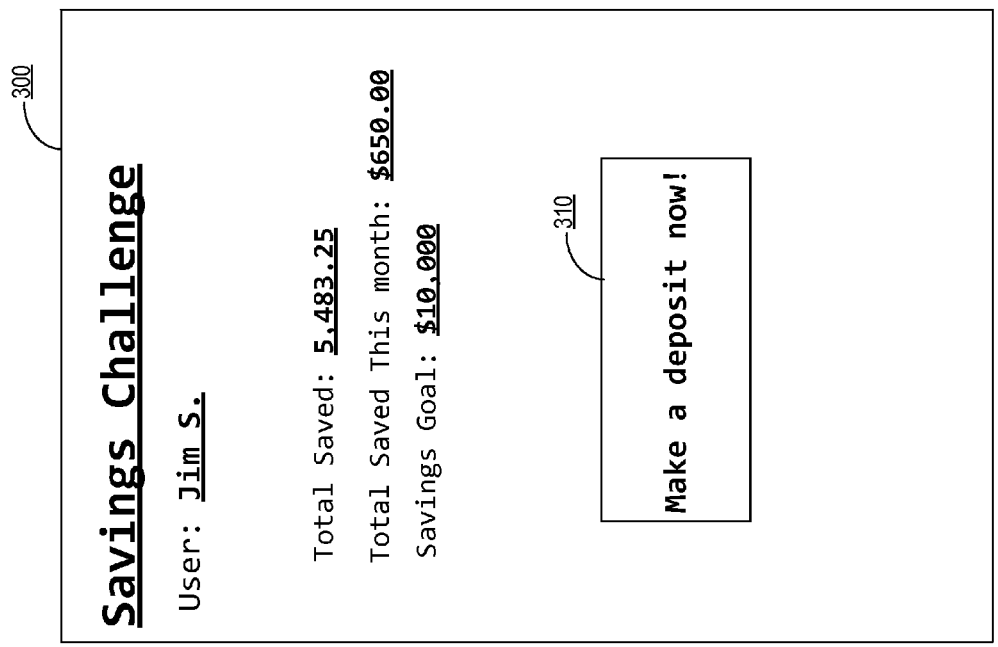
FIG. 3 depicts an exemplary interface of a game in accordance with aspects and implementations of the present disclosure.

By way of illustration, a game (e.g., game 121 as depicted in FIG. 1) can be provided to a user (e.g., user 102A), such as in response to a request for such a game received from such a user (e.g., a request to download the game, a visit to a webpage corresponding the game, etc.). Such a game can, for example, be an interactive challenge that may encourage, assist, facilitate, etc., the user to save money and/or achieve one or more financial goals/objectives, though it should be understood that any number of other games can be substituted. As described in greater detail herein, FIGS. 3-8 depict various interfaces of such a game. For example, FIG. 3 depicts an exemplary interface 300 of a 'Savings Challenge' game which enables a user to track his/her progress towards a savings goal. FIG. 4 depicts another exemplary interface 400 of such a game, showing a leaderboard of various users that may compete in such a challenge.

At block 210 one or more interactions can be received. In certain implementations, such interactions can be received from a user (such as the user to which the game was provided at block 205). Moreover, in certain implementations such interactions can be received with respect to a game (such as the game provided at block 205). That is, as noted, having received and/or otherwise accessed a game (e.g., from a central server), a user can interact with such a game in any number of ways. Such interactions can, in turn, be relayed to the central server. For example, as depicted in FIG. 3, user interface 300 can include one or more selectable controls, such as button 310 which, when selected, can enable the user to initiate a deposit. As noted, such an interaction (e.g., the selection of button 310) can be relayed to game server 150. In one aspect, block 210 is performed by gamification engine 140.

At block 215 one or more interactions (such as those received at block 210) can be processed. In doing so, a value can be computed. In certain implementations, such a value can be associated with a defined achievement. That is, it can be appreciated that the manner in which a user interacts with a particular game can be analyzed in order to identify one or more characteristics, tendencies, etc., associated with the user. For example, based on various interactions provided by a user with respect to a particular game, it can be determined that a user may have a particular interest or need in a particular product or service. Accordingly, having identified such an interest/need, a corresponding value can be computed. Such a value can reflect, for example, a value that can be attributed to such a user initiating, purchasing, etc., such a product/service. By way of further example, based on various interactions provided by a user with respect to a particular game, it can be determined that a user may have a particular capability or capacity to contribute towards and/or complete a particular challenge, task, etc. Accordingly, having identified such a capability/capacity, a corresponding value can be computed. Such a value can reflect, for example, a value that can be attributed to such a user contributing towards and/or completing a particular challenge, task, etc. In one aspect, block 215 is performed by gamification engine 140.

By way of illustration, as described in relation to FIG. 3, having received various interactions from a user with respect to button 310 (corresponding to various deposits that such a user makes, such as in connection with the 'Savings Challenge' game), one or more tendencies of such a user can be identified (e.g., a tendency to deposit a certain amount per week, month, etc.). Having identified such tendencies, one or more services that may be of interest to such a user (e.g., a high-yield savings account) can be identified, and a value (e.g., to the service provider) associated with having the user initiate, purchase, etc., such a service can be computed (e.g., $100 per year for a high-yield savings account with at least $5000 deposited).

Moreover, in certain implementations one or more interactions received with respect to another game (e.g., a game other than that provided at block 205) can be processed. That is, in addition to and/or in lieu of receiving/processing interactions with respect to a first game, interactions (such as those provided by the same user) received with respect to one or more other games can also be received and/or analyzed. In doing so, a value associated with a defined achievement can be computed. For example, having received such interactions with respect to various other games (e.g., games other than that provided at block 205), such interactions can be processed/analyzed in order to identify one or more characteristics, tendencies, etc., associated with the user. It can be appreciated that such identified characteristics, tendencies, etc. (which, as noted, can be identified in relation to one or more other games) can be further utilized to determine, for example, that a user may have a particular interest or need in a particular product or service. Accordingly, having identified such an interest/need (e.g., based on interactions provided by the user with respect to one or more other games), a corresponding value can be computed, reflecting, for example, a value that can be attributed to such a user initiating one or more actions with respect to such a product/service, contributing towards and/or completing a particular challenge or task, etc. For example, in addition to participating in the 'Savings Challenge' game, a particular user (e.g., 'Jim S.') can also be determined to participate in a 'House Hunting Challenge' game, in which the user may utilize various tools to search for houses for sale. Accordingly, such interactions (e.g., with the 'House Hunting Challenge' game can also be received and analyzed, such as in order to compute a value, etc., such as in the manner described herein).

At block 220 a prompt can be generated. In certain implementations, such a prompt can be generated based on a value (such as a value computed at block 215). Moreover, in certain implementations such a prompt can include a notification. Such a notification can reflect, for example, a reward associated with the defined achievement. Moreover, in certain implementations such a prompt can be generated based on a value (such as a value computed at block 215) and with respect to the first game and/or a second game. For example, having identified (e.g., based on various interactions provided by the user with respect to the game provided at block 205 and/or one or more other games) a value that can be attributed to such a user initiating one or more actions with respect to such a product/service, contributing towards and/or completing a particular challenge or task, etc., one or more prompts can be generated which can include various notifications, information, etc., which can pertain to a reward or incentive that may be provided to the user upon initiating/completing such actions, challenges, tasks, etc. In one aspect, block 220 is performed by gamification engine 140.

At block 225 a prompt (such as the prompt generated at block 220) can be provided. In certain implementations, such a prompt can be provided within a game (e.g., the game provided at block 205). For example, while the user is playing/interacting with a particular game (e.g., the game provided at block 205), a prompt (such as the prompt generated at block 220) can be provided and/or otherwise transmitted to the user. In certain implementations, such a prompt can be provided at a point, interval and/or stage of the game with respect to which the user may have the option to initiate one or more actions, such as those that may pertain to the initiation and/or completion of one or more actions, challenges, tasks, etc. (such as with respect to which the value was computed, such as at block 215). In doing so, the user can be advised of and/or incentivized to take one or more further actions within a particular game in order to initiate and/or complete one or more of the referenced actions, challenges, tasks, etc. In one aspect, block 225 is performed by gamification engine 140.

Figure 5:
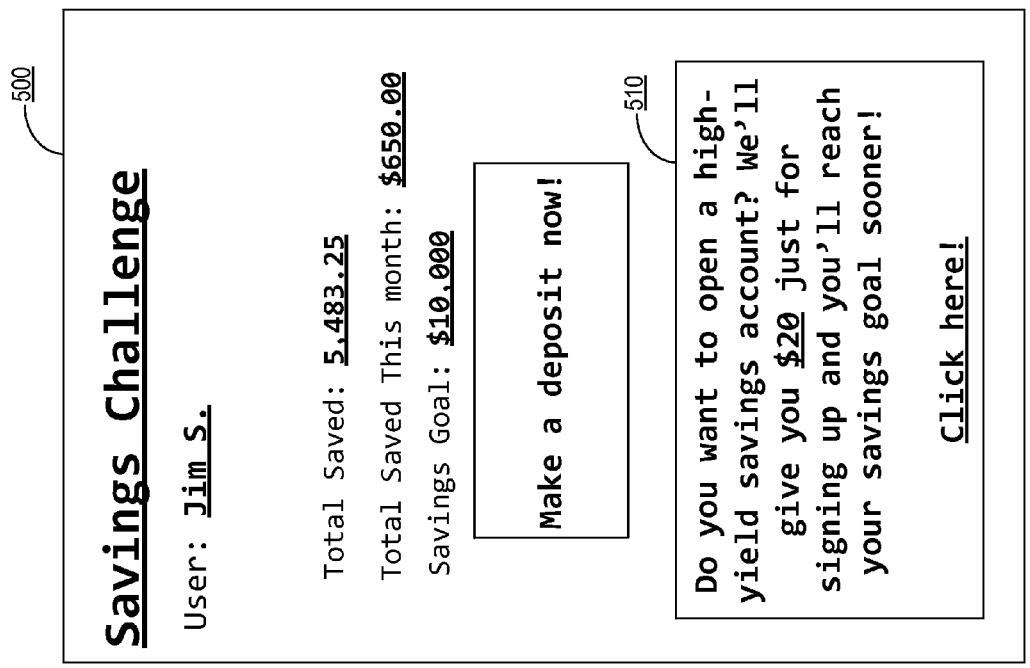
FIG. 5 depicts an exemplary interface of a game in accordance with aspects and implementations of the present disclosure.

For example, FIG. 5 depicts an exemplary user interface 500 of a 'Savings Challenge' game in which a prompt 510 has been incorporated. Such a prompt 510 can be generated (e.g., at block 220), for example, based on various tendencies, characteristics, etc. of the user (reflecting, for example, the amounts and/or frequency that the user makes deposits within the 'Savings Challenge' game) and/or a value identified with respect to such a user initiating one or more actions with respect to such a product/service (e.g., an average $100 per year profit for a high-yield savings account with at least $5000 deposited) a prompt 510 can be provided which can encourage and/or give the user the option to initiate one or more actions (here, to open a high-yield savings account) which may pertain to the initiation and/or completion of one or more actions, challenges, tasks, etc. (e.g., the 'Savings Challenge' that the user is participating in).

Figure 6:
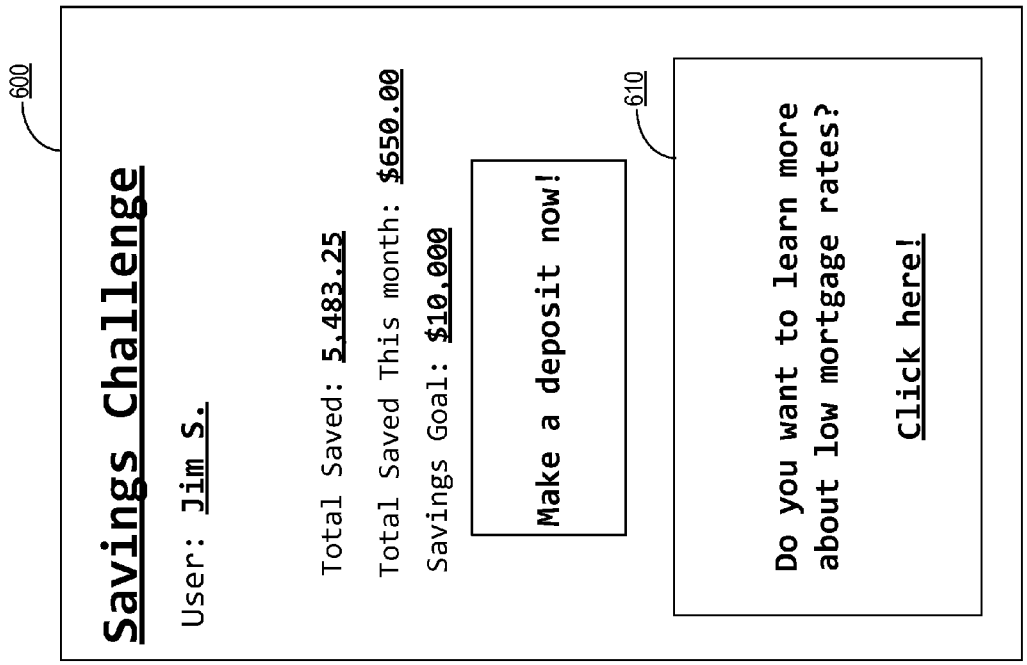
FIG. 6 depicts an exemplary interface of a game in accordance with aspects and implementations of the present disclosure.

By way of further example, FIG. 6 depicts an exemplary user interface 600 of a 'Savings Challenge' game in which a prompt 610 has been incorporated. Such a prompt 610 can be generated (e.g., at block 220), for example, based on various tendencies, characteristics, etc. of the user, such as with respect to another game (e.g., the 'House Hunting Challenge') and/or a value or likelihood identified with respect to such a user initiating one or more actions with respect to a particular product/service (e.g., an relative likelihood that a user saving at least $5000 may be interested in purchasing real estate) a prompt 610 can be provided which can encourage and/or give the user the option to initiate one or more actions (here, learn about low mortgage rates). As noted, in certain implementations such a prompt can be provided within one game (e.g., 'Savings Challenge') based on interactions provided by the user (e.g., 'Jim S.') in relation to another game (e.g., 'House Hunting Challenge'). In doing so, an organization can provide adaptive/customized rewards, such as by providing a reward/promotion in one game (e.g., 'Savings Challenge') that may otherwise pertain to another game (e.g., 'House Hunting Challenge'). Such features enable the organization to 'cross sell' and/or otherwise promote products that the organization offers, such as in settings (e.g., in a 'Savings Challenge' game) in which such products may not otherwise be promoted.

At block 230 one or more interactions can be received. In certain implementations, such interactions can be received from a second user (e.g., a user other than the user from which interactions were received at block 210). Moreover, in certain implementations such interactions can be received from such a user with respect to one game (e.g., the game provided at block 205), while in other implementations such interactions can be received (additionally or alternatively) with respect to another game (e.g., a game other than that provided at block 205). Such interactions can be received, for example, in a manner substantially comparable to that described herein with respect to block 210. For example, as noted, in addition to receiving interactions from user 'Jim S.' with respect to a particular game (e.g., 'Savings Challenge'), various interactions can be received from other users, such as 'Kelly R.' As noted with respect to FIG. 4, in certain implementations such users may participate together in one or more games (e.g., 'Savings Challenge'). In one aspect, block 230 is performed by gamification engine 140.

At block 235 one or more interactions (such as those received from a second user, such as at block 230) can be processed. In doing so, a degree of achievement of the second user can be determined, such as with respect to the defined achievement. Such a degree of achievement of the second user can be determined, for example, in a manner substantially comparable to that described herein with respect to block 215. It should be noted that while in certain implementations such a degree of achievement can also pertain to the game provided at block 205, in other implementations the degree of achievement can pertain to another game. Moreover, in certain implementations, in a scenario where both the interactions of the first user and those of the second user pertain to the same game, the referenced degree of achievement associated with the first user may be different than the degree of achievement associated with the second user. For example, one or more interactions of user 'Kelly R.' can be received and processed to determine the amount that the user has saved during the 'Savings Challenge' (e.g., as a dollar amount and/or as a function of a savings goal). In one aspect, block 235 is performed by gamification engine 140.

At block 240 a second prompt can be generated. In certain implementations, such a prompt can be generated based on the degree of achievement of the second user (e.g., as determined at block 235). Such a prompt can include and/or reflect a notification of the degree of achievement of the second user, such as in relation to the first game (e.g., the game provided at block 205). It should be understood that such a prompt can be generated, for example, in a manner substantially comparable to that described herein with respect to block 220, though it should be understood that, in certain implementations, such a prompt is generated based on the degree of achievement of the second user (e.g., as determined at block 235). In one aspect, block 240 is performed by gamification engine 140.

At block 245 the second prompt (such as that generated at block 240) can be provided. In certain implementations, such a prompt can be provided to the first user (e.g., the user to which the game was provided at block 205) within the first game (e.g., the game provided at block 205). It should be understood that such a prompts can be provided, for example, in a manner substantially comparable to that described herein with respect to block 225, though, in certain implementations, such a prompt may be generated with respect to one game and/or user and provided with respect to another game and/or user, as described herein. In one aspect, block 245 is performed by gamification engine 140.

Figure 7:
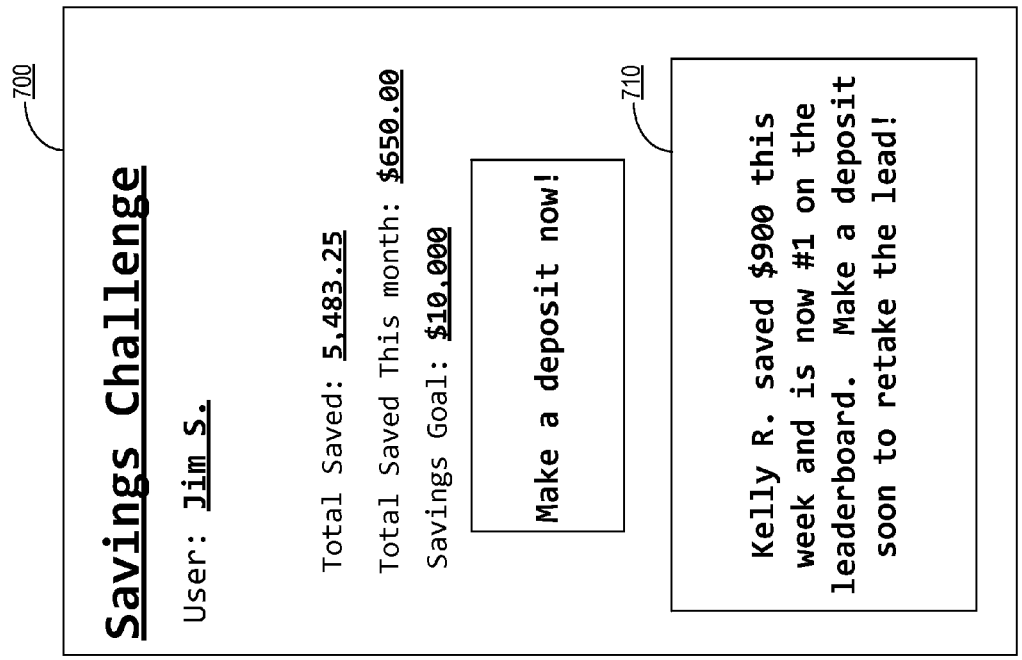
FIG. 7 depicts an exemplary interface of a game in accordance with aspects and implementations of the present disclosure.

For example, FIG. 7 depicts an exemplary user interface 700 of a 'Savings Challenge' game that can be provided to one user (e.g., 'Jim S.') in which a prompt 710 has been incorporated. Such a prompt 710 can be generated (e.g., at block 240), for example, based on various tendencies, characteristics, etc. identified with respect to another user (e.g., 'Kelly R.'), such as a user that is also participating in a group challenge. As noted, based on various determinations that can be computed, for example, with respect to the amounts and/or frequency that 'Kelly R.' makes deposits within the 'Savings Challenge' game), a prompt 710 can be generated and provided to 'Jim S.' which can encourage and/or give the user (i.e., 'Jim S.') the option to initiate one or more actions (here, to make a deposit) which may pertain to one or more aspects of the 'Savings Challenge' (e.g., in order to maintain a certain status within the challenge leaderboard).

At block 250 one or more second interactions can be received. In certain implementations, such interactions can be received from the first user (e.g., the user to which the game was provided at block 205) with respect to the first game (e.g., the game provided at block 205). It should be understood that such interactions can be received, for example, in a manner substantially comparable to that described herein with respect to block 210, though, in certain implementations, such second interactions may be received subsequent to the providing of a prompt (such as at block 225 and/or block 245), as described herein. For example, one or more subsequent interactions (e.g., corresponding to various deposits) can be received (e.g., from user 'Jim S.') over the course of a 'Savings Challenge' game. In one aspect, block 250 is performed by gamification engine 140.

At block 255 one or more second interactions (such as those received at block 250) can be processed. In doing so, an updated value associated with a defined achievement can be computed. It should be understood that such interactions can be processed, for example, in a manner substantially comparable to that described herein with respect to blocks 215 and/or 235, though, in certain implementations, such second interactions may be received subsequent to the providing of a prompt (such as at block 225 and/or block 245), as described herein. For example, based on the referenced second interactions, a previously computed value (reflecting, for example, a value that can be attributed to such a user initiating one or more actions with respect to such a product/service, contributing towards and/or completing a particular challenge or task, etc.) can be computed in a manner that accounts for such interactions and/or otherwise updates the value to account for one or more other changes that may affect such a value. In one aspect, block 255 is performed by gamification engine 140.

By way of illustration, having received various interactions from a user with respect to button 310 (corresponding to various deposits that such a user makes, such as in connection with the 'Savings Challenge' game), one or more tendencies (e.g., a tendency to deposit a certain amount per week, month, etc.) and/or trends associated with such a user (reflecting, for example, that the user is approaching his/her savings goal, has saved a particular amount, etc.) can be identified. Having identified such tendencies, trends, etc., one or more services that may be of interest to such a user (e.g., a high-yield savings account) can be identified, and a value (e.g., to the service provider) associated with having the user initiate, purchase, etc., such a service can be computed. In certain implementations, changes in such a value (as may be determined based on various user interactions, e.g., that the user accumulates more savings over time) can also be accounted for in computing such a value (e.g., as a user saves more money, the potential value of such a user opening a high-yield savings account increases).

At block 260 a second prompt can be generated. In certain implementations, such a prompt can be generated based on the updated value (e.g., as computed at block 255). Moreover, in certain implementations such a prompt can reflect and/or include a notification of a second reward associated with the defined achievement. It should be understood that such a prompt can be generated, for example, in a manner substantially comparable to that described herein with respect to blocks 220 and/or 240, though it should be understood that, in certain implementations, such a prompt can generated based on an updated value (e.g., as computed at block 255). In one aspect, block 260 is performed by gamification engine 140.

At block 265 the second prompt (e.g., as generated at block 260) can be provided within a game (e.g., the game that provided at block 205). It should be understood that such a prompt can be provided, for example, in a manner substantially comparable to that described herein with respect to blocks 225 and/or 245. In one aspect, block 265 is performed by gamification engine 140.

Figure 8:
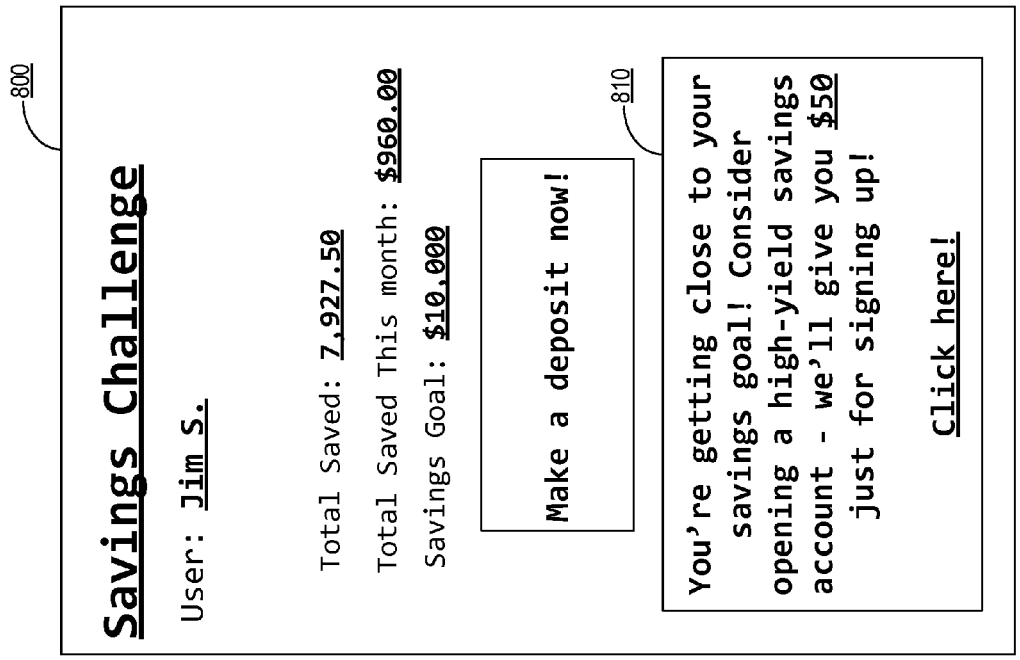
FIG. 8 depicts an exemplary interface of a game in accordance with aspects and implementations of the present disclosure.

For example, FIG. 8 depicts an exemplary interface 800 of a 'Savings Challenge' game in a scenario where a user ('Jim S.') has saved additional funds. In such a case, a prompt 810 can be generated and provided to the user which can encourage/incentivize the user to open a high-yield savings account (and provide a $50 bonus for doing so). As noted, such a prompt 810 can be generated and provided based on a value computed in view of various interactions provided by the user over the course of the game, reflecting that the user has saved $7927.50 over the course of the game. Based on such a determination, a $50 bonus can be offered to the user for opening a high-yield savings account (in contrast to the $20 bonus offered in FIG. 5), which can be computed, for example, based on an expected value (e.g., to the provider of the high-yield savings account) of $200 per year for a high-yield savings account with at least $7500 deposited.

Figure 9:
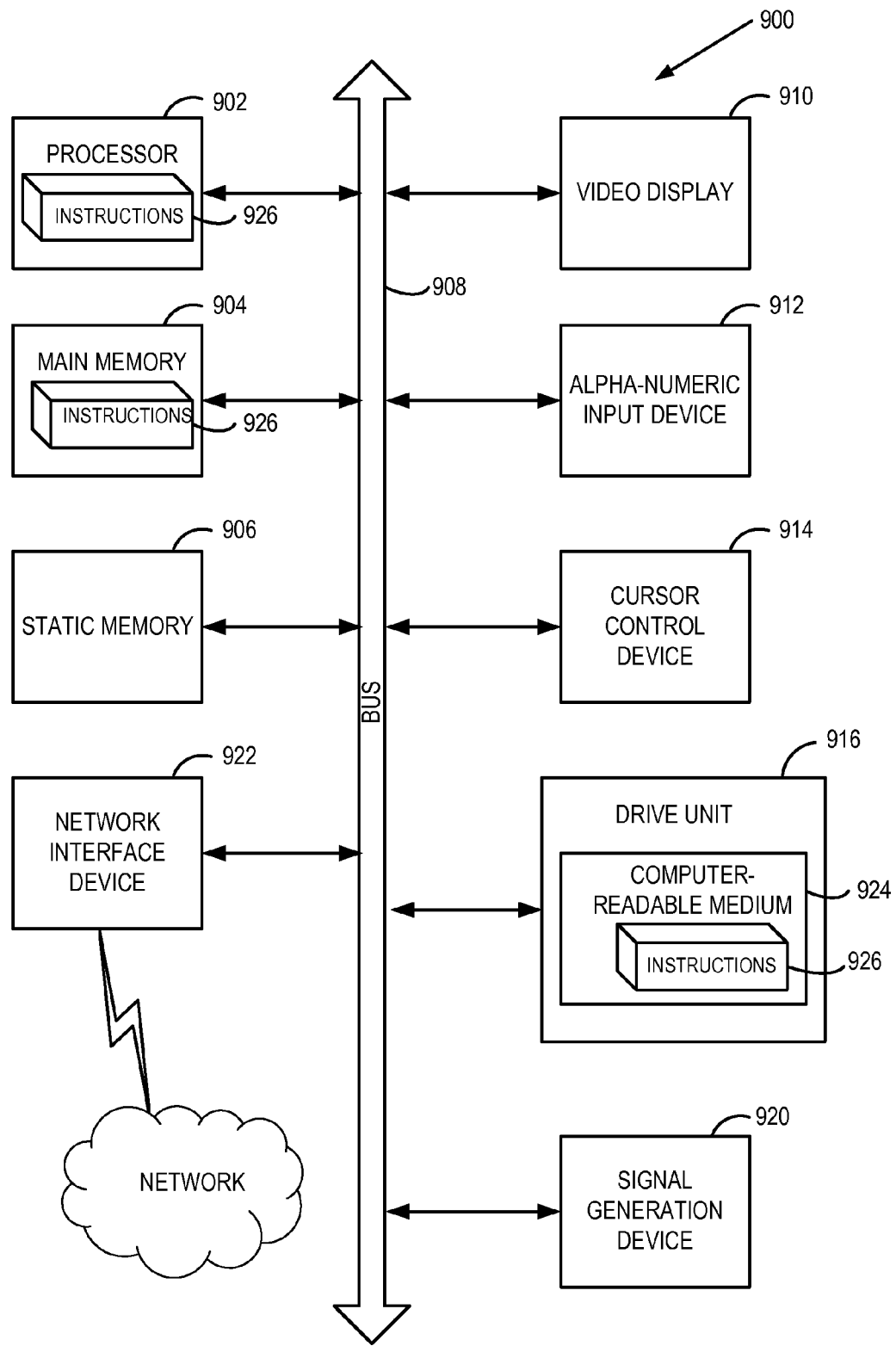
FIG. 9 depicts a block diagram of an illustrative computer system operating in accordance with aspects and implementations of the present disclosure.

FIG. 9 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions 926 (e.g., instructions executed by collaboration manager 225, etc.) embodying any one or more of the methodologies or functions described herein. Instructions 926 may also reside, completely or at least partially, within the main memory 904 and/or within the processor 902 during execution thereof by the computer system 900, the main memory 904 and the processor 902 also constituting computer-readable media. Instructions 926 may further be transmitted or received over a network via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "determining," "detecting," "analyzing," "validating," "executing," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, those described and/or referenced herein. The scope of the disclosure should, therefore, be determined with reference to the appended claims, along with the full scope of equivalents to which such claims are entitled.

What is claimed is:

1. A method for dynamic game deployment allowing an organization to deploy games across multiple users, the method comprising:

provide multiple games including at least a first game and a second game from a gamification engine of a game server over a network to a first user operating a user device, the first game including an interactive challenge encouraging the first user to achieve at least one objective and the second game including another interactive challenge encouraging the first user to achieve a second objective;

receiving one or more first interactions from the first user with respect to the first game and one or more second interactions from the first user with respect to the second game, the one or more first and second interactions occurring through manipulation of a selectable control provided on a user interface, wherein manipulation of the selectable control relays the one or more first and second interactions to the game server over the network;

analyzing, using the processing device, the first interactions and the second interactions to identify one or more tendencies associated with the first user;

identifying one or more services of interest to the first user based on the identified tendencies;

processing, with a processing device, the one or more first interactions and the one or more second interactions to compute a value associated with a defined achievement related to the one or more services, the computed value representing an expected value to the organization of the first user accepting the one or more services;

generating, based on the value computed as a result of the one or more first and second interactions, a first prompt, the first prompt comprising a notification of a first reward resulting from the first or second interactions and offering the one or more services, the first prompt including a link allowing the first user to navigate over the network to a page including details regarding the first reward and the one or more services; and providing the first prompt within the first game or the second game over the network to the first user.

2. The method of claim 1, further comprising:
receiving one or more interactions from a second user;
processing the one or more interactions from the second user to determine a degree of achievement of the second user with respect to the defined achievement;
generating, based on the degree of achievement of the second user, a second prompt, the second prompt comprising a notification of the degree of achievement of the second user in relation to the first game; and
providing the second prompt to the first user within the first game.

3. The method of claim 2, wherein receiving one or more interactions from a second user comprises receiving one or more interactions from a second user with respect to the first game.

4. The method of claim 2, wherein receiving one or more interactions from a second user comprises receiving one or more interactions from a second user with respect to the second game.

5. The method of claim 1, further comprising:
receiving one or more second interactions from the first user with respect to the first game;
processing the one or more second interactions to compute an updated value associated with a defined achievement;
generating, based on the updated value, a second prompt, the second prompt comprising a notification of a second reward associated with the defined achievement; and
providing the second prompt within the first game.

6. A system for dynamic game deployment allowing an organization to deploy games across multiple users, the system comprising:

a memory; and
a processing device, coupled to the memory, to:
provide multiple games including at least a first game and a second game from a gamification engine of a game server over a network to a first user operating a user device, the first game including an interactive challenge encouraging the first user to achieve at least one objective and the second game including another interactive challenge encourage the first user to achieve a second objective;

receive one or more first interactions from the first user with respect to the first game and one or more second interactions from the first user with respect to the second game, the one or more first and second interactions occurring through manipulation of a selectable control provided on a user interface, wherein manipulation of the selectable control relays the one or more first and second interactions to the game server over the network;

analyze, using the processing device, the first interactions and the second interactions to identify one or more tendencies associated with the first user;

identify one or more services of interest to the first user based on the identified tendencies;

process the one or more first interactions and the one or more second interactions to compute a value associated with a defined achievement related to the one or more services, the computed value representing an expected value to the organization of the first user accepting the one or more services;

generate, based on the value computed as a result of the one or more first and second interactions, a first prompt, the first prompt comprising a notification of a first reward resulting from the first or second interactions and offering the one or more services, the first prompt including a link allowing the first user to navigate over the network to a page including details regarding the first reward and the one or more services; and provide the first prompt within the first game or the second game over the network to the first user.

7. The system of claim 6, wherein the processing device is further to:
receive one or more interactions from a second user;
process the one or more interactions from the second user to determine a degree of achievement of the second user with respect to the defined achievement;
generate, based on the degree of achievement of the second user, a second prompt, the second prompt comprising a notification of the degree of achievement of the second user in relation to the first game; and
provide the second prompt to the first user within the first game.

8. The system of claim 7, wherein to receive one or more interactions from a second user is to receive one or more interactions from a second user with respect to the first game.

9. The system of claim 7, wherein to receive one or more interactions from a second user is to receive one or more interactions from a second user with respect to the second game.

10. The system of claim 6, wherein the processing device is further to:
receive one or more second interactions from the first user with respect to the first game;
process the one or more second interactions to compute an updated value associated with a defined achievement;

generate, based on the updated value, a second prompt, the second prompt comprising a notification of a second reward associated with the defined achievement; and provide the second prompt within the first game.

11. A non-transitory computer readable medium having instructions stored thereon that, when executed by a processor, cause the processor to perform operations for dynamic game deployment allowing an organization to deploy games across multiple users comprising:

providing multiple games including at least a first game and a second game from a gamification engine of a game server over a network to a first user operating a user device, the first game including an interactive challenge encouraging the first user to achieve at least one objective and the second game including another interactive challenge encouraging the first user to achieve a second objective;

receiving one or more first interactions from the first user with respect to the first game and one or more second interactions from the first user with respect to the second game, the one or more first and second interactions occurring through manipulation of a selectable control provided on a user interface, wherein manipulation of the selectable control relays the one or more first and second interactions to the game server over the network;

analyzing, using the processing device, the first interactions and the second interactions to identify one or more tendencies associated with the first user;

identifying one or more services of interest to the first user based on the identified tendencies;

processing, with the processor, the one or more first interactions and the one or more second interactions to compute a value associated with a defined achievement related to the one or more services, the computed value representing an expected value to the organization of the first user accepting the one or more services;

generating, based on the value computed as a result of the one or more first and second interactions, a first prompt, the first prompt comprising a notification of a first reward resulting from the first or second interaction and offering the one or more services, the first prompt including a link allowing the first user to navigate over the network to a page including details regarding the first reward and the one or more services; and providing the first prompt within the first game or the second game over the network to the first user.

12. The non-transitory computer readable medium of claim 11, further having instructions stored thereon that, when executed by the processor, cause the processor to perform operations comprising:

receiving one or more interactions from a second user;

processing the one or more interactions from the second user to determine a degree of achievement of the second user with respect to the defined achievement;

generating, based on the degree of achievement of the second user, a second prompt, the second prompt comprising a notification of the degree of achievement of the second user in relation to the first game; and providing the second prompt to the first user within the first game.

13. The non-transitory computer readable medium of claim 11, further having instructions stored thereon that, when executed by the processor, cause the processor to perform operations comprising:

receiving one or more second interactions from the first user with respect to the first game;

processing the one or more second interactions to compute an updated value associated with a defined achievement;

generating, based on the updated value, a second prompt, the second prompt comprising a notification of a second reward associated with the defined achievement; and providing the second prompt within the first game.

* * * * *